US008094550B2

(12) United States Patent  
Winter

(10) Patent No.: US 8,094,550 B2
(45) Date of Patent: Jan. 10, 2012

(54) METHODS AND SYSTEMS FOR CONTROLLING NETWORK COMMUNICATION PARAMETERS

(75) Inventor: Robert L. Winter, Georgetown, TX (US)

(73) Assignee: Dell Product L.P., Round Rock, TX (US)

( * ) Notice: Subject to any disclaimer, the term of this patent is extended or adjusted under 35 U.S.C. 154(b) by 350 days.

(21) Appl. No.: 12/075,298

(22) Filed: Mar. 10, 2008

(65) Prior Publication Data

US 2009/0225773 A1    Sep. 10, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04J 3/06* (2006.01)

(52) U.S. Cl. ..................... 370/229; 370/503
(58) Field of Classification Search .......... 370/229, 370/231, 232, 235, 394, 503, 504
See application file for complete search history.

(56) References Cited

U.S. PATENT DOCUMENTS

| 4,849,969 A | 7/1989 | Annamalai |
| 4,849,970 A | 7/1989 | McCool |
| 5,982,778 A * | 11/1999 | Mangin et al. ............ 370/445 |
| 5,995,488 A | 11/1999 | Kalkunte et al. |
| 6,055,578 A | 4/2000 | Williams et al. |
| 6,108,306 A | 8/2000 | Kalkunte et al. |
| 6,661,804 B2 | 12/2003 | Fellman et al. |
| 6,751,231 B2 | 6/2004 | Fellman et al. |
| 7,574,594 B2 * | 8/2009 | Winter .......................... 713/151 |
| 7,596,644 B2 | 9/2009 | Yu et al. ........................ 710/60 |
| 7,610,413 B2 | 10/2009 | Pope et al. ..................... 710/36 |
| 2006/0053117 A1 | 3/2006 | McAlpine et al. |
| 2006/0109784 A1 * | 5/2006 | Weller et al. ................. 370/229 |
| 2006/0191001 A1 | 8/2006 | Winter |
| 2006/0221831 A1 * | 10/2006 | Wadekar et al. ............. 370/235 |
| 2009/0097481 A1 * | 4/2009 | Diab et al. .................... 370/389 |

FOREIGN PATENT DOCUMENTS

WO    WO2006/039615 A1    4/2006

OTHER PUBLICATIONS

Muller et al., "Proposal for a MAC <-> PHY Rate Control Mechanism", Sun Microsystems Computer Company, IEEE 802.3ae, 2000, 14 pgs.
"10 Gigabit Ethernet", Network World, Printed from Internet Feb. 1, 2008, 6 pgs.
"Not Using All of That GigE Pipe? Save Some Energy", Network World, Printed From Internet Feb. 1, 2008, 3 pgs.

* cited by examiner

*Primary Examiner* — Xavier Szewai Wong
(74) *Attorney, Agent, or Firm* — O'Keefe, Egan, Peterman & Enders LLP

(57) ABSTRACT

Methods and systems for controlling network communication parameters (e.g., data transfer rate) employed by two or more network nodes communicating over a network communications link by using the Inter-Packet Gap (IPG) length to sending network communication parameter information (e.g., rate control information) between the nodes over the network communications link.

52 Claims, 5 Drawing Sheets

METHODS AND SYSTEMS FOR CONTROLLING NETWORK COMMUNICATION PARAMETERS

BACKGROUND OF THE INVENTION

1. Field of the Invention

This invention relates generally to network communications, and more particularly to controlling rate or other network communication parameters for network communications.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, the higher data transfer rate that a communications interface uses, the more energy it uses. For example, a current 10GBASE-T PHY interface (10 Gbps Ethernet over CAT6/6a7 cable) consumes approximately 10 Watts compared to a current 1000BASE-T PHY interface (1 Gbps Ethernet over CAT5e cable) which consumes less than 1 Watt. Although the ability to auto-negotiate (automatically change rate to the lowest found rate on a link) exists the ability to very quickly change the link rate programmatically does not exist. Unless a rate change occurs quickly upper layer protocols will timeout, retransmit or drop connection. The possibility of fast-rate adaptable communications devices is currently being explored by the Energy Efficient Ethernet Study Group in the Institute for Electrical and Electronics Engineers (IEEE).

It is known to use an OSI layer 1 (L1) based mechanism for rate control by modifying the interpacket gap length to improve performance or reduce frame rate.

SUMMARY OF THE INVENTION

Disclosed herein are methods and systems for controlling network communication parameters (e.g., data transfer rate) employed by two or more network nodes communicating over a network communications link by using the Inter-Packet Gap (IPG) length to sending network communication parameter information (e.g., rate control information) between the nodes over the network communications link. The transmitted network communication parameter information may then be employed to modify or otherwise change the network communication parameters employed by the two or more network nodes based on the received network communication parameter information, (e.g., to change data transfer rate, upwardly or downwardly by using the Inter-Packet Gap IPG length to communicate rate control information between opposite ends of a network communications link).

In one exemplary embodiment, a first value of IPG length may be utilized to indicate an increase in data transfer rate value between two or more network nodes that are configured to communicate across a network communication link at two or more different designated data transfer rates. A second value of IPG length may be utilized to indicate a decrease in data transfer rate value between the same two or more network nodes. A third value of IPG length may be utilized to indicate no change in data transfer rate value between the same two or more network nodes. In this manner, a frame may be transmitted by a first one of the network nodes to a second one of the network nodes with the first value of IPG length to indicate to the second network node that the data transfer rate is to be increased to the next higher designated data transfer rate. In like manner, a frame may be transmitted by a first one of the network nodes to a second one of the network nodes with the second value of IPG length to indicate to the second network node that the data transfer rate is to be decreased to the next lower designated data transfer rate. Alternatively, a frame may be transmitted by a first one of the network nodes to a second one of the network nodes with the third value of IPG length to indicate to the second network node that the data transfer rate is to be left unchanged. With the receipt of each frame, the second network node may determine the particular IPG length associated therewith. The second network node may then determine based on the transmitted IPG length whether the data transfer rate is to be increased, decreased, or left unchanged, and then adapt itself to communicate with the first network node accordingly. As before, this process may be repeated as necessary or desired to change the data transfer rate (upwardly or downwardly) employed for communication between network nodes.

The disclosed methods and systems may be implemented in one exemplary embodiment using an OSI layer 2 (L2) based mechanism to achieve PHY rate control on a frame basis. In another exemplary embodiment, the disclosed methods and systems may be implemented to achieve a data transfer rate change (up or down) within a frame time of about 1 milli-second (ms) or less. In another exemplary embodiment, the disclosed methods and systems may be advantageously implemented using Energy Efficient Ethernet (EEE) capable devices since control information may be sensed within an Ethernet frame time.

The disclosed methods and systems may be advantageously implemented to control data transfer rate in physical layer frame-based networks (networks using network protocols having a physical layer component) including, but are not limited to, Ethernet (IEEE 802.3), RS232, ATM, FTDI, TCI Express, InfiniBand, Fibre Channel, Token Ring, Wireless LAN (802.11), Packetized Cellular Radio, etc. In one exemplary embodiment, the disclosed methods and systems may utilize the concept of the IPG (Inter-Packet Gap) as defined by IEEE 802.3 to communicate data transfer rate control information and to achieve data transfer rate control, for example, in an Ethernet Local Area Network (LAN). The methodology of the disclosed methods and systems may be similarly implemented with other types of frame-based network communication protocols that employ inter-packet gaps such as Wireless LAN networks which have Inter-Frame Spacing (IFS) characteristics which are similar in nature to IPG (Inter-Packet Gap) for Ethernet.

In one exemplary embodiment, the method may be employed to increase the energy efficiency of the network communication link by selectively decreasing the data transfer rate used by the two or more network nodes to communicate over the network communication link in order to reduce energy consumption of the two or more network nodes to communicate across the network communication link when a higher data transfer rate is not required or desired by a user application, and only increasing the data transfer rate used by the two or more network nodes to communicate over the network communication link when a higher data transfer rate is required or desired by a user or application.

In one respect, disclosed herein is a method of controlling network communication parameters employed by two or more information handling systems communicating as network nodes over a network communication link, including: selecting and associating an inter-packet gap (IPG) with a first frame at a first one of the network nodes, a length of the IPG being selected to specify a subset of selected network communication parameter/s from a set of available network communication parameters to be used by the two or more network nodes to communicate with each other over the network communication link, and transmitting the first frame across the network communication link from the first one of the network nodes to a second one of the network nodes; receiving the first frame at the second one of the network nodes; determining the length of the IPG associated with the first frame at the second one of the network nodes; and employing the specified subset of selected network communication parameter/s at the second one of the network nodes for communication back with the first one of the network nodes over the network communications link based on and in response to the determined length of the IPG associated with the received first frame. The specified subset of selected network communication parameter/s includes a feature of the network communication link or protocol used by the network communication link to communicate between the two or more network nodes across the network communication link and that defines at least one of interface capability characteristics, data rate characteristics, data structure characteristics, or a combination thereof.

In another respect, disclosed herein is a method of controlling network communication parameters employed by two or more information handling systems communicating as network nodes over a network communication link, including at least one of: (a) selecting and associating an inter-packet gap (IPG) with a first frame at a first one of the network nodes, a length of the IPG being selected to specify a subset of selected network communication parameter/s from a set of available network communication parameters to be used by the two or more network nodes to communicate with each other over the network communication link, and transmitting the first frame across the network communication link from the first one of the network nodes to a second one of the network nodes; or (b) receiving a second frame at a first one of the network nodes, the second frame being transmitted across the network communication link from a second one of the network nodes to the first one of the network nodes with an inter-packet gap (IPG) associated with the second frame, a length of the IPG of the second frame specifying a subset of selected network communication parameter/s from a set of available network communication parameters to be used by the two or more network nodes to communicate with each other over the network communication link, determining the length of the IPG associated with the second frame at the first one of the network nodes and employing the specified subset of selected network communication parameter/s at the first one of the network nodes for communication back with the second one of the network nodes over the network communications link based on and in response to the determined length of the IPG associated with the second frame. The specified subset of selected network communication parameter/s includes a feature of the network communication link or protocol used by the network communication link to communicate between the two or more network nodes across the network communication link and that defines at least one of interface capability characteristics, data rate characteristics, data structure characteristics, or a combination thereof.

In another respect, disclosed herein is an information handling system configured as a first network node for communicating with one or more other network nodes over a network communication link, the information handling system including at least one of: (a) frame processing logic configured to select and associate an inter-packet gap (IPG) with a first frame, a length of the IPG being selected to specify a subset of selected network communication parameter/s from a set of available network communication parameters to be used by the first network node and a second one of the other network nodes to communicate with each other over the network communication link, and transmit the first frame across the network communication link from the first one of the network nodes to the second one of the network nodes; or (b) frame processing logic configured to receive a second frame transmitted across the network communication link from a second one of the network nodes with an inter-packet gap (IPG) associated with the second frame, a length of the IPG of the second frame specifying a subset of selected network communication parameter/s from a set of available network communication parameters to be used by the first network node and the second one of the other network nodes to communicate with each other over the network communication link, determine the length of the IPG associated with the second frame, and employ the specified subset of selected network communication parameter/s for communication back with the second one of the network nodes over the network communications link and based on and in response to the determined length of the IPG associated with the second frame. The specified subset of selected network communication parameter/s includes a feature of the network communication link or protocol used by the network communication link to communicate between the first network node and the one or more other network nodes across the network communication link and that defines at least one of interface capability characteristics, data rate characteristics, data structure characteristics, or a combination thereof.

DESCRIPTION OF ILLUSTRATIVE EMBODIMENTS

Figure 1:
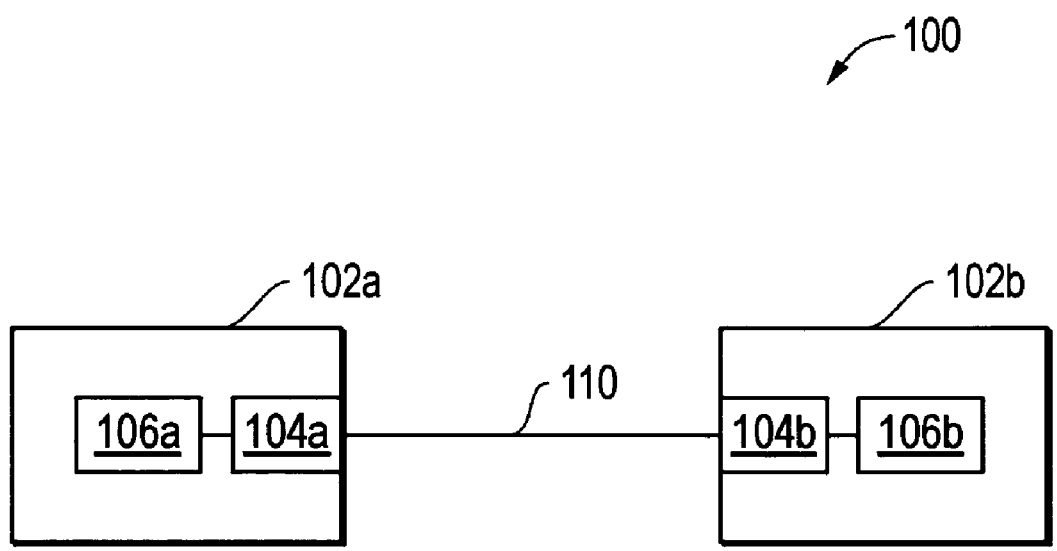
FIG. 1 is a simplified block diagram of a network configuration as it may be employed in the practice of one exemplary embodiment of the disclosed methods and systems.

FIG. 1 illustrates one exemplary embodiment of network 100 that includes two network nodes 102*a* and 102*b* (e.g., information handling systems such as personal computers or other suitable computer system/s) that communicate packet information across network communication link 110 (e.g., Ethernet bus). Network 100 may employ any network communication protocol that employs frame-based communication patterns having spacing or gaps between frames. Network 100 may be configured as part of a local area network (LAN), wide area network (WAN), metropolitan area network (MAN), personal area network (PAN), etc. For example Network 100 may be a LAN that is communicatively coupled to an external network, such as the Internet and/or a wide area network ("WAN") via a server, although communication with such an external network is not necessary.

As shown, each of network nodes 102a and 102b includes a respective network interface (NI) 104a and 104b coupled to network bus 110. Network interface 104 may be a network interface card (NIC) or any other combination of hardware, software and/or firmware that is suitable for handling physical layer processing details of frame reception and/or transmission. Each of network nodes 102a and 102b may also be provided with processing component 106a and 106b, respectively, that may be implemented by one or more processors/microcontrollers and optional memory with firmware and/or software executing thereon that is configured to implement methodology of the disclosed methods and systems as described herein. Together, a network interface component 104 and associated processing component 106 of a given network node 102 may be so provided together to implement frame processing logic that implements the network communication parameter control methodology of the disclosed methods and systems as described herein. It will be understood that the particular illustrated components 104 and 106 of network nodes 102 of FIG. 1 are exemplary only, and that other configurations of fewer (i.e., one) and more than two components may be implemented as frame processing logic using any number and/or combination of processing, controller, software and/or firmware that is suitable for implementing the network communication parameter control methodology of the disclosed methods and systems as described herein.

It will be understood that the configuration of network nodes 102 and topology of network 100 are exemplary only, and it will be understood that the disclosed methods and systems may be implemented in networks having other bus or non-bus topologies (e.g., ring topology), and/or with networks including one or more information handling systems configured as router nodes. Furthermore, it will be understood that the disclosed methods and systems may be implemented with any number of two or more network nodes that are in communication with each other across any wired and/or wireless network communication medium/s suitable for supporting frame-based network communications. Examples of such networks include, but are not limited to, Transport Control Protocol/Internet Protocol ("TCP/IP") based networks over suitable frame-based physical layers. Specific frame-based physical layers include, but are not limited to, IEEE 802.11 series wireless networks, IEEE 802.3 wired networks, cellular wireless networks, etc.

Figure 2:
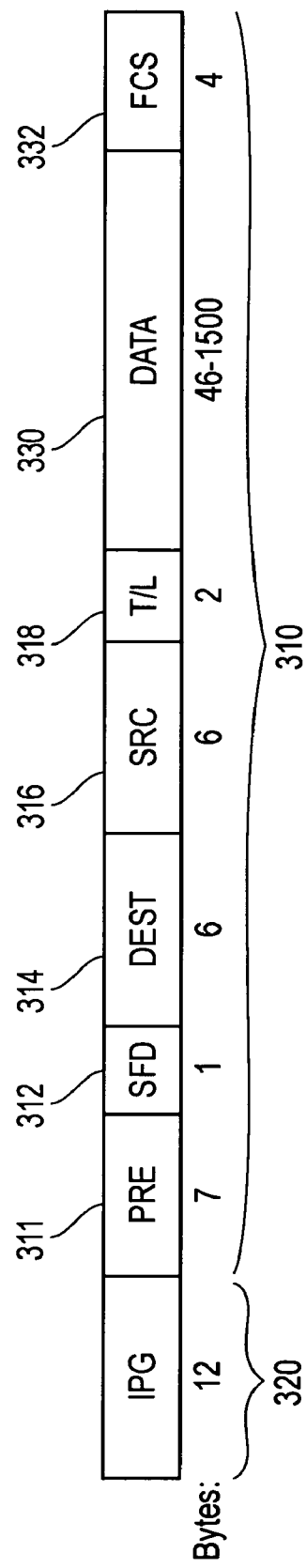
FIG. 2 shows is simplified representation of a single network frame that may be communicated across a network according to one exemplary embodiment of the disclosed methods and systems.
Figure 3:
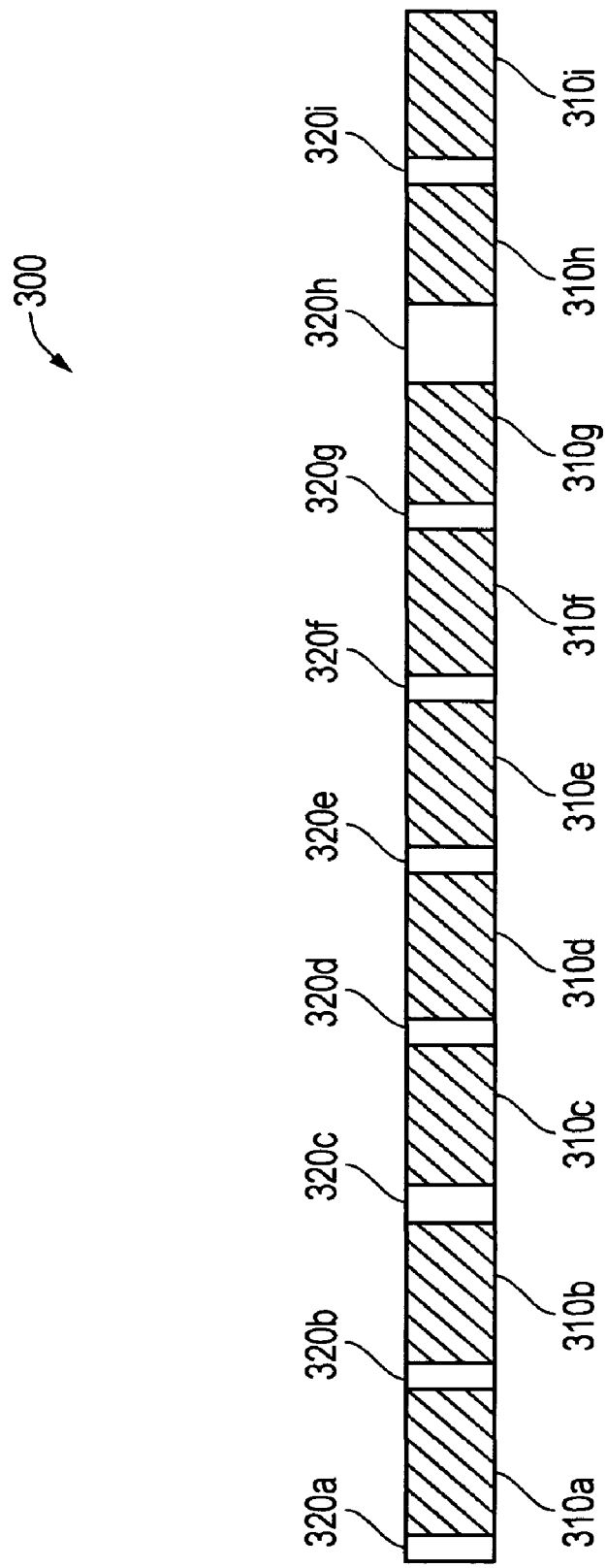
FIG. 3 is simplified representation of a stream of network frames that may be communicated across a network according to one exemplary embodiment of the disclosed methods and systems.

FIG. 2 shows an exemplary format for a single frame 310 of FIG. 2, in this case as it may be configured as an Ethernet frame in one exemplary embodiment of the disclosed methods and systems. As shown in FIG. 3, frame 310 is preceded by inter-packet gap 320, and includes header information followed by payload in the form of data. In particular, frame 310 includes header fields in the form of preamble (PRE) 311, start-frame delimiter (SFD) 312, destination MAC address (DEST) 314, source MAC address (SRC) 316 and type/length field information (T/L) 318. Header information is followed by payload in the form of data 330, and frame check sequence (FCS) 332. It will be understood that the particular illustrated combination of Ethernet fields provided within frame 310 is exemplary only, and that the disclosed methods and systems may be implemented with a frame format configured according to any type of Ethernet or non-Ethernet frame-based communication protocol that employs IPGs to separate frames (e.g., including frame formats having other combinations of types and/or lengths of fields that are present within a given frame). Such frame-based communications may employ frames that include, but are not limited to, any combination of header and payload fields that is suitable for facilitating frame-based communications. In the exemplary embodiment of FIG. 3, IPG length is 12 bytes, which corresponds to the IEEE 802.3 specified minimum IPG length of 12 bytes. As will be further described, this IPG length may be varied to communicate rate control information between network nodes.

FIG. 3 shows a stream 300 of network frames (e.g., Ethernet frames) 210a-210i that may be communicated across bus 110 between network nodes 102a and 102b of FIG. 1 (e.g., transmitted from first network node 102a to second network nod 102b or vice-versa) according to one exemplary embodiment of the disclosed methods and systems. As illustrated in FIG. 3, each given frame 210a-210i is preceded by a respective inter-packet gap (IPG) 330a-330i that is associated with the given frame and that separates it from a preceding frame. As further illustrated, each IPG 330a-330b, 330d-330g and 330i has the same length, in this case corresponding to the minimum inter-packet gap (IPG) requirement for the given network protocol being maintained (e.g., for an IEEE 802.3 network, the IPG of authorized frames may be larger but not smaller than the IEEE 802.3 specified minimum IPG length of 12 bytes). In this exemplary embodiment, an IPG length of 12 bytes indicates to receiving network node 102 that no change in the current data transfer rate is to occur.

Still referring to FIG. 3, each of IPG 330c and 330h has a length that is longer than the minimum inter-packet gap in order to communicate rate control information between network communications links, e.g., IPG 330c has a length of 13 bytes and IPG 330h has a length of 14 bytes. In this exemplary embodiment, when LPG 330c is received the IPG length of 13 bytes indicates to the receiving network node 102 that the data transfer rate is to be increased by one step (e.g., from 1 Gbps to 10 Gbps). In contrast, when IPG 330h is received the IPG length of 14 bytes indicates to the receiving network node 102 that the data transfer rate is to be decreased by one step (e.g., from 10 Gbps to 1 Gbps). An IPG length of greater than 14 bytes indicates no data transfer rate change is to occur.

It will be understood that the particularly described values of IPG length and their corresponding rate control meanings described in relation to FIG. 3 are exemplary only. In this regard, minimum IPG length may vary to suit different types of networks. Furthermore, more than two different values may of IPG may be employed to indicate rate changes, e.g., a fourth value of IPG length of 15 bytes may be employed in the embodiment of FIG. 3 to indicate a two-step data transfer rate increase, and a fifth value of IPG length of 16 bytes may be employed to indicate a two step data transfer rate decrease, etc.

In another embodiment, each of the IPG lengths of 12, 13 and 14 of FIG. 3 may be correlated to a particular data transfer rate (e.g., data transfer rates of 1 Gbps, 10 Gbps, and 100 Gbps, respectively). In such an embodiment, receipt of frames 330a-330b, 330d-330g and 330i indicate to the receiving network node 102 that a data transfer rate of 1 Gbps is to be used, receipt of frame 330c indicate to the receiving network node 102 that a data transfer rate of 10 Gbps is to be used, and receipt of frame 330h indicates to the receiving network node 102 that a data transfer rate of 100 Gps is to be used. In this exemplary embodiment, data transfer rate may be dynamically changed to a given selected data transfer rate in ad hoc manner.

Figure 4:
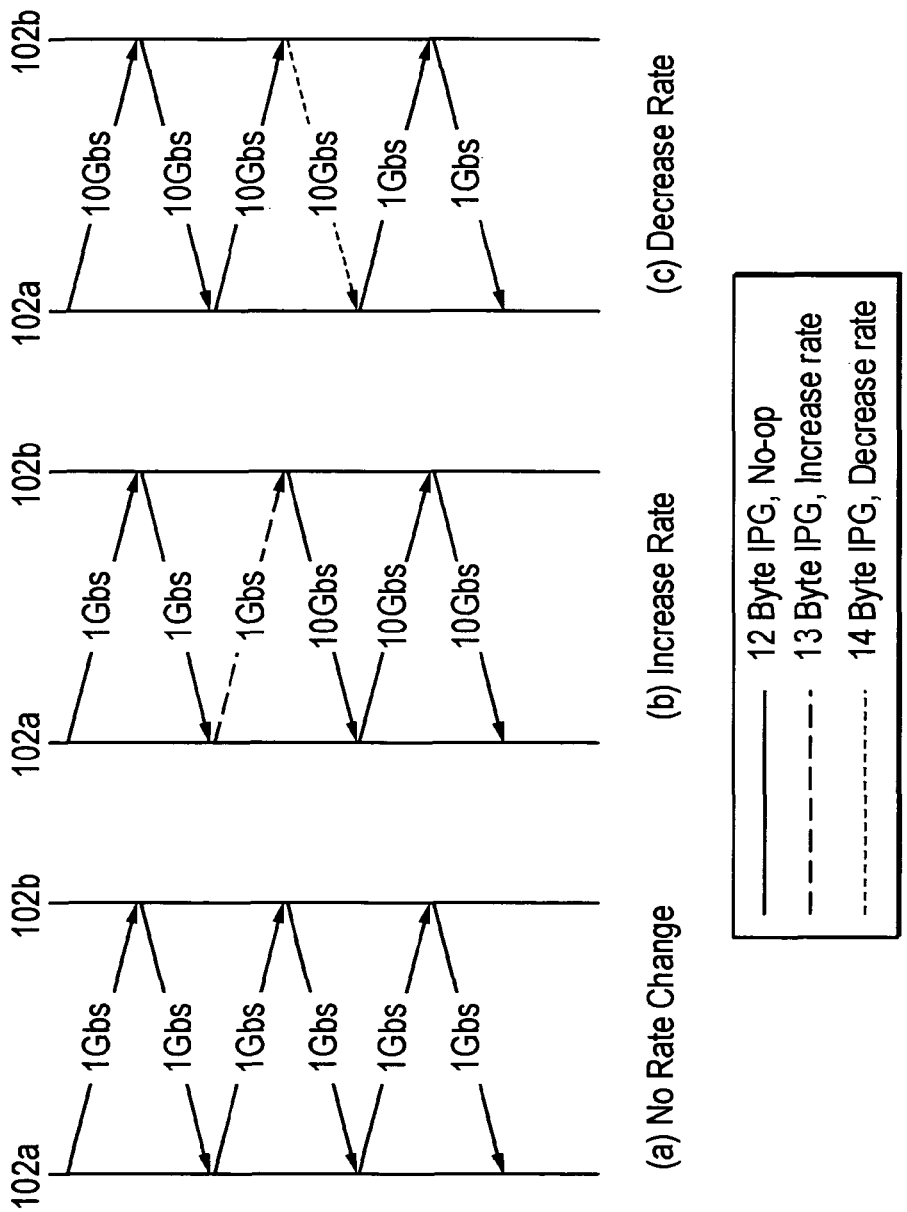
FIG. 4 is a protocol timing sequence diagram according to one exemplary embodiment of the disclosed methods and systems.

FIG. 4 is a protocol timing sequence diagram for one exemplary embodiment of the disclosed methods and systems in which IPG length is used to communicate data transfer rate control information between two nodes 102a and 102b of an Ethernet network communications link. When employed for such an Ethernet network communication embodiment, the Ethernet IPG may have a minimum length value of 12 bytes to ensure proper and expected behavior, (although it may be more), and the value of IPG length may be set independent of the instantaneous link rate at which the IPG and accompanying frame is being communicated. In the exemplary embodiment of FIG. 4, two additional IPG values of 13 and 14 bytes are defined for communication between nodes 102a and 102b. In the illustrated embodiment, a rate control "increase" is signaled by one node 102 to another node 102 using an IPG value of 13 bytes and a rate control "decrease" is signaled by one node 102 to another node 102 using an IPG value of 14 bytes, it being understood that the assignment of a particular IPG value to signal either "increase" or "decrease" is arbitrary and may be vice-versa (i.e., rate control "increase" may be signaled by IPG of 14 bytes and rate control "decrease" may be signaled by IPG value of 13 bytes), or may be implemented using other IPG values for signaling rate changes (e.g., 15 bytes, 16 bytes, etc.).

Still referring to the exemplary embodiment of FIG. 4, each of network nodes 102a and 102b are configured to detect IPG changes, so that data transfer rate control information may be sent within a frame time without interfering with standard Ethernet operation. In this exemplary embodiment, IPG lengths of 12 bytes and IPG lengths or greater than 14 bytes will be accepted as non-information carrying IPG values by each node and no rate change. When one network node 102 receives an IPG of 13 bytes then it will rate adapt to the next available or pre-defined rate that is higher than its' current rate setting. If no higher rate is available (i.e., data transfer rate is at maximum), then the receiving network node does not change its data transfer rate setting. Similarly, when one network node 102 receives an IPG of 14 bytes it will rate adapt to the next available or pre-defined rate that is lower its' current rate setting. If no lower rate is available (i.e., data transfer rate is at minimum), then the receiving network node does not change its data transfer rate setting. In the event that a given network node 102 cannot recognize IPG size differences or cannot rate adapt, then no operation will be performed (i.e., no interruption of the expected service model defined in IEEE 802.3 will be observed for Ethernet network communications). In one exemplary embodiment, available Ethernet link data transfer rates may be pre-defined as 10 Mbps, 100 Mbps, 1 Gbps, 10 Gbps and 100 Gbps, although different number and/or values of data transfer rates may be pre-defined for other embodiments.

In sequence (a) of FIG. 4, data frames having IPG values of 12 bytes are exchanged at 1 Gbs between network nodes 102a and 102b, indicating "no-op" or that no data transfer rate change is to occur. In sequence (b) of FIG. 4, a data frame having an IPG value of 13 bytes is sent at a data transfer rate of 1 Gbs from network node 102a to 102b to signal a rate increase from 1 Gbs to the next available predefined rate of 10 Gbs. As shown, network node 102b responds by communicating with a data transfer rate of 10 Gbs and both nodes 102a and 102b communicate at a 10 Gbs thereafter. In sequence (c) of FIG. 4, a data frame having an IPG value of 14 bytes is sent at a data transfer rate of 10 Gbs from network node 102b to 102a to signal a rate decrease from 10 Gbs to the next available lower predefined rate of 1 Gbs. As shown, network node 102a responds by communicating with a data transfer rate of 1 Gbs and both nodes 102a and 102b communicate at a 1 Gbs thereafter.

Figure 5:
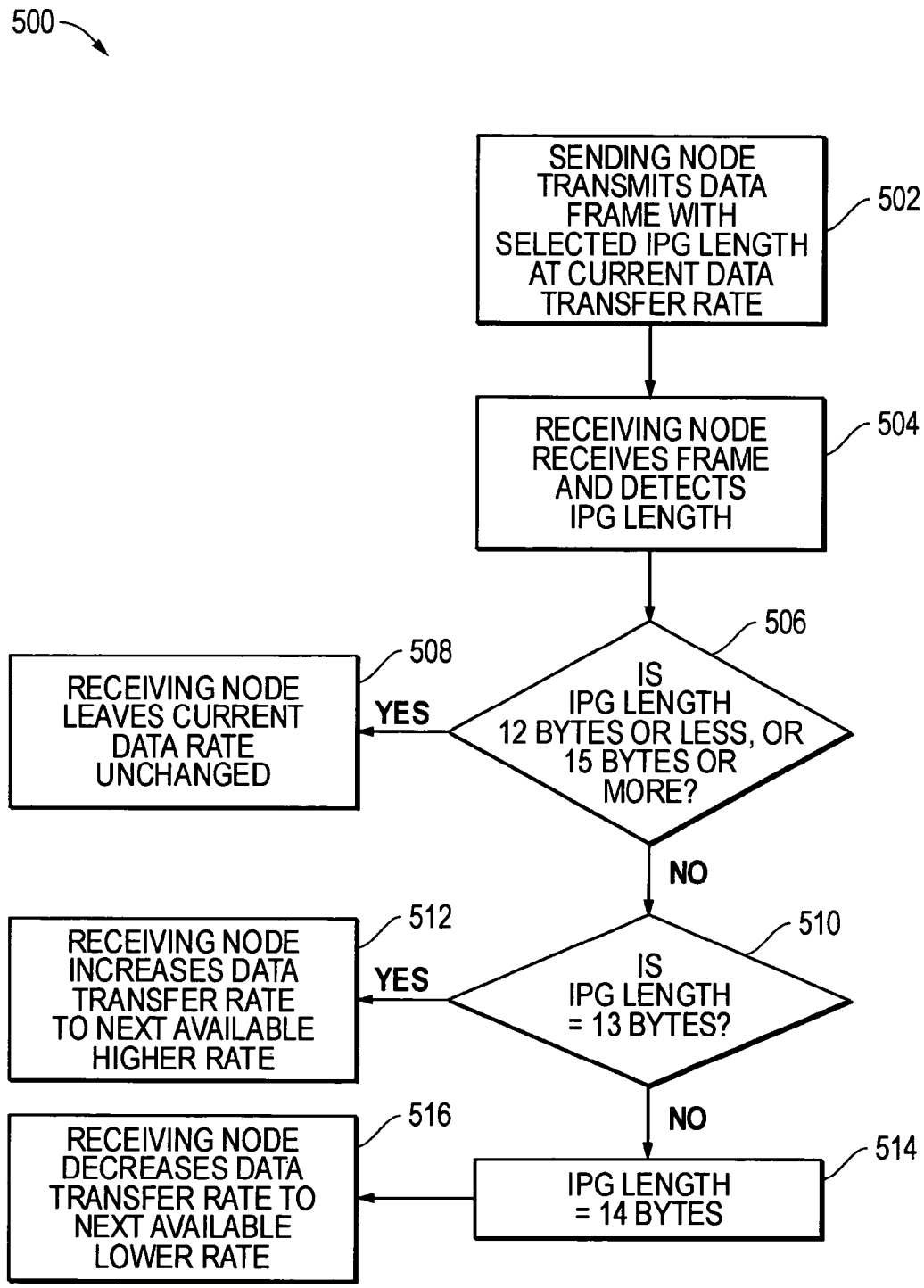
FIG. 5 illustrates methodology according to one exemplary embodiment of the disclosed methods and systems.

FIG. 5 corresponds to the exemplary embodiment of FIG. 4 and illustrates methodology 500 in which IPG length is used to communicate data transfer rate control information between two nodes 102a and 102b of an Ethernet network communications link. In step 502, a sending network node 102a transmits a given data frame to a receiving node 102b at the current data transfer rate, but having an IPG length that corresponds to the selected or desired data transfer rate for the next communication from the receiving node to the sending node. The receiving node 102b receives the given data frame in step 504 and detects the IPG length. If in step 506 the IPG length is found to be 12 bytes or less, or 15 bytes or more, then the receiving node 102b leaves the current data transfer rate unchanged in step 508 and responds to network node 102a at the current (unchanged) data transfer rate. Otherwise, methodology proceeds to step 510. If in step 510 the IPG length is found to be 13 bytes, then the receiving node 102b increases the data transfer rate in step 512 to the next available higher data transfer rate and responds to network node 102a at this higher data transfer rate. Otherwise, by default the IPG length is 14 bytes in step 514 and the receiving node 102b decreases the data transfer rate in step 516 to the next available lower data transfer rate and responds to network node 102a at this lower data transfer rate. It will be understood that the particular order and number of steps in FIG. 5 is exemplary only and that any other order and/or number and type of steps may be employed that is suitable for using IPG length to communicate data transfer rate control information between two network nodes.

It will also be understood that the embodiments of FIGS. 4 and 5 are exemplary only and that any other magnitude and/or combination of IPG values may be employed that is suitable for signaling data transfer rate changes between two network nodes 102. For example, one or more given values of IPG length may be correlated to one or more respective data transfer rate values, and this correlation may be stored at two or more network nodes 102 that are configured to communicate with each other across a network communication link at the one or more respective data transfer rate values. In this manner, a frame may be transmitted by a first one of the network nodes to a second one of the network nodes with a given value of IPG length that correlates to a selected first data transfer rate for communication between the first and second network nodes. The second network node may then receive the transmitted frame from across the network communications link and determine the IPG length associated therewith. The second network node may then determine the selected data transfer rate from the stored correlation of IPG length versus data transfer rate, and then adapt itself to communicate with the first network node at the selected first data transfer rate across the network communications link if it is not already communicating with the first network node at the selected first data transfer rate. This process may be repeated as necessary or desired to change the data transfer rate (upwardly or downwardly) employed for communication between network nodes.

Furthermore, it will be understood that the disclosed methods and systems for encoding information within the IPG of network frames may be applied to other frame-based physical layer protocols and the type of network communication parameter information communicated in this way is not restricted to specification of data transfer rate. In this regard, the disclosed methods and systems may be employed to utilize IPG length to communicate information from one network node to another network node/s that specifies a subset (i.e., one or more) selected network communication parameter/s from a set of available network communication parameters that may be employed by two or more network nodes to communicate with each other over a given network communication link/s. In this regard, the term "network communication parameter" refers to any feature of a network communication interface or protocol used by such an interface that defines the interface capability characteristics, data rate characteristics or data structure characteristics employed to communicate between network nodes across a network communication link. Examples of subsets of network communication parameters that may be so specified using the disclosed methods and systems include, but are not limited to, the type of interface employed to communicate over the network communication link (e.g., type of optical interface to be employed for communication), the particular data structure (e.g., frame size, encryption scheme, etc.) employed to communicate over the network communication link, the interface capabilities employed to communicate over the network communication link (e.g., distance and/or speed capabilities of an interface), etc.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of controlling network communication parameters employed by two or more information handling systems communicating as network nodes over a network communication link, comprising:

selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes;

receiving said first frame at said second one of said network nodes;

determining said length of said IPG associated with said first frame at said second one of said network nodes; and employing said specified subset of selected network communication parameter/s at said second one of said network nodes for communication back with said first one of said network nodes over said network communications link based on and in response to said determined length of said IPG associated with said received first frame;

the specified subset of selected network communication parameter/s comprising a feature of said network communication link or protocol used by said network communication link to communicate between said two or more network nodes across said network communication link and that defines at least one of interface capability characteristics, data rate characteristics, data structure characteristics, or a combination thereof.

2. The method of claim 1, the specified subset of selected network communication parameter/s comprising a specified new data transfer rate to be used by said two or more network nodes to communicate over said network communication link, the new data transfer rate being different than the data transfer rate of the first frame from the first one of said network nodes to the second of said network nodes.

3. The method of claim 2, the method employed to increase the energy efficiency of said network communication link by selectively decreasing the data transfer rate used by said two or more network nodes to communicate over said network communication link in order to reduce energy consumption of said two or more network nodes to communicate across said network communication link when a higher data transfer rate is not required or desired by a user application, and only increasing the data transfer rate used by said two or more network nodes to communicate over said network communication link when a higher data transfer rate is required or desired by a user or application.

4. The method of claim 3, the network communication link comprising an Ethernet network communication link.

5. The method of claim 2, the two or more network nodes communicating over said network communication link at a first data transfer rate; the method further comprising then controlling the data transfer rate used by said two or more network nodes to communicate over said network communication link by:

selecting and associating an IPG with said first frame at said first one of said network nodes, a length of said IPG associated with said first frame being selected to specify a second and different data transfer rate to be used next by said two or more network nodes to communicate over said network communication link, said second data transfer rate being different from said first data transfer rate;

receiving said first frame at said second one of said network nodes;

determining said length of said IPG associated with said first frame at said second one of said network nodes; and then transmitting a second frame from said second network node back to said first network node at said specified second data transfer rate based on and in response to said determined length of said IPG associated with said received first frame.

6. The method of claim 2, a first value of IPG length associated with a data frame specifying an increase in data transfer rate value over a current data transfer rate value being used between said two or more network nodes to communicate over said network communication link; a second value of IPG length associated with a data frame specifying a decrease in data transfer rate value over a current data transfer rate value being used between said two or more network nodes to communicate over said network communication link; a third value of IPG length associated with a data frame specifying no change in data transfer rate value in data transfer rate value over a current data transfer rate value being used between said two or more network nodes to communicate over said network communication link; and the method further comprising:

selecting and associating an IPG having said first value of IPG length with said first frame at said first one of said network nodes, transmitting said first frame across said network communication link from said first one of said network nodes to said second one of said network nodes to indicate to the second network node that the data transfer rate is to be increased from the data transfer rate currently being used between said two or more network nodes to communicate over said network communication link, receiving said second frame across said network communication link at said second network node, determining said first value of IPG length of said IPG associated with said first frame at said second one of said network nodes, and then transmitting a second frame from said second network node back to said first network node at an increased data transfer rate relative to the current data transfer rate based on and in response to said determined first value of IPG length associated with said received first frame;

selecting and associating an IPG having said second value of IPG length with a third frame at said first one of said network nodes, transmitting said third frame across said network communication link from said first one of said network nodes to said second one of said network nodes to indicate to the second network node that the data transfer rate is to be decreased from the data transfer rate currently being used between said two or more network nodes to communicate over said network communication link, receiving said third frame across said network communication link at said second network node, determining said second value of IPG length of said IPG associated with said third frame at said second one of said network nodes, and then transmitting a fourth frame from said second network node back to said first network node at a decreased data transfer rate relative to the current data transfer rate based on and in response to said determined second value of IPG length of said IPG associated with said received third frame; and selecting and associating an IPG having said third value of IPG length with a fifth frame at said first one of said network nodes, transmitting said fifth frame across said network communication link from said first one of said network nodes to said second one of said network nodes to indicate to the second network node that the data transfer rate is to be unchanged from the data transfer rate currently being used between said two or more network nodes to communicate over said network communication link, receiving said fifth frame across said network communication link at said second network node, determining said length of said IPG associated with said fifth frame at said second one of said network nodes, and then transmitting a sixth frame from said second network node back to said first network node at an unchanged data transfer rate relative to the current data transfer rate based on and in response to said determined length of said IPG associated with said received fifth frame.

7. The method of claim 1, comprising:
selecting and associating an inter-packet gap (IPG) with the first frame at the first one of said network nodes, a length of said IPG being selected from a stored correlation between available network communication parameters and IPG gap length that is maintained at said first one of said network nodes to specify a subset of selected network communication parameter/s to be used by said two or more network nodes to communicate with each other over said network communication link, and transmitting said first frame across said network communication link from said first one of said network nodes to the second one of said network nodes;

receiving said first frame at said second one of said network nodes;

determining said length of said IPG associated with said first frame at said second one of said network nodes;

determining said specified subset of selected network communication parameter/s at said second one of said network nodes from a stored correlation between available network communication parameters and IPG gap length that is maintained at said second one of said network nodes; and employing said specified subset of selected network communication parameter/s at said second one of said network nodes for communication back with said first one of said network nodes over said network communications link based on and in response to said determined length of said IPG associated with said received first frame.

8. The method of claim 7, the stored correlation between available network communication parameters and IPG gap length that is maintained at said first and second ones of said network nodes comprising given values of IPG length correlated to respective data transfer rate values.

9. The method of claim 1, the specified subset of selected network communication parameter/s comprising a feature of said network communication link or protocol used by said network communication link to communicate between said two or more network nodes across said network communication link and that defines interface capability characteristics.

10. The method of claim 1, the specified subset of selected network communication parameter/s comprising a data transfer rate to be used by said two or more network nodes to communicate over said network communication link, the length of said IPG being selected to specify a predefined stepwise increase or decrease in data transfer rate to be used by said two or more network nodes to communicate with each other over said network communication link; and the method further comprising increasing the data transfer rate by a predefined step relative to the data transfer rate of the first frame or decreasing the data transfer rate by a predefined step relative to the data transfer rate of the first frame at said second one of said network nodes for communication back from said second one of said network nodes to said first one of said network nodes over said network communications link based on and in response to said determined length of said IPG associated with said received first frame.

11. The method of claim 1, the specified subset of selected network communication parameter/s comprising a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link; and the method further comprising using the determined IPG length associated with said received first frame to select a given predefined data transfer rate correlating to the determined IPG length from the predefined correlation of possible data transfer rates and IPG lengths for communication back from said second one of said network nodes to said first one of said network nodes over said network communications link.

12. The method of claim 1, the specified subset of selected network communication parameter/s comprising a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link; the method further comprising using the determined IPG length associated with said received first frame to select a given predefined data transfer rate correlating to the determined IPG length from the predefined correlation of possible data transfer rates and IPG lengths for communication back from said second one of said network nodes to said first one of said network nodes over said network communications link; and where the predefined correlation includes predefined IPG lengths of 12 bytes, 13 bytes and 14 bytes and predefined data transfer rates of 1 Gbps, 10 Gbps, and 100 Gbps.

13. The method of claim 1, the specified subset of selected network communication parameter/s comprising a data transfer rate to be used by said two or more network nodes to communicate over said network communication link; and the length of said IPG associated with the first frame being set independent of the instantaneous link rate at which the IPG associated with the accompanying first frame is communicated across said network communication link from said first one of said network nodes to the second one of said network nodes.

14. The method of claim 1, the specified subset of selected network communication parameter/s comprising a data transfer rate to be used by said two or more network nodes to communicate over said network communication link; and the length of said IPG being larger to specify an increase in data transfer rate to be used by said two or more network nodes to communicate with each other, and the length of said IPG being smaller to specify a decrease in data transfer rate to be used by said two or more network nodes to communicate with each other.

15. The method of claim 1, the specified subset of selected network communication parameter/s comprising a feature of said network communication link or protocol used by said network communication link to communicate between said two or more network nodes across said network communication link and that defines data structure characteristics.

16. A method of controlling network communication parameters employed by two or more information handling systems communicating as network nodes over a network communication link, comprising:
(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes; and
(b) receiving a second frame at the first one of said network nodes, said second frame being transmitted across said network communication link from the second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;
the specified subset of selected network communication parameter/s comprising a feature of said network communication link or protocol used by said network communication link to communicate between said two or more network nodes across said network communication link and that defines at least one of interface capability characteristics, data rate characteristics, data structure characteristics, or a combination thereof.

17. The method of claim 16, comprising:
(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes; and
(b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;

the specified subset of selected network communication parameter/s comprising a feature of said network communication link or protocol used by said network communication link to communicate between said two or more network nodes across said network communication link and that defines at least one of interface capability characteristics, data rate characteristics, data structure characteristics, or a combination thereof.

18. The method of claim 16, the specified subset of selected network communication parameter/s comprising a specified data transfer rate to be used by said two or more network nodes to communicate over said network communication link.

19. The method of claim 18, the method being employed to increase the energy efficiency of said network communication link by selectively decreasing the data transfer rate used by said two or more network nodes to communicate over said network communication link in order to reduce energy consumption of said two or more network nodes to communicate across said network communication link when a higher data transfer rate is not required or desired by a user application, and only increasing the data transfer rate used by said two or more network nodes to communicate over said network communication link when a higher data transfer rate is required or desired by a user or application.

20. The method of claim 19, the network communication link comprising an Ethernet network communication link.

21. The method of claim 18, the method further comprising then controlling the data transfer rate used by said two or more network nodes to communicate over said network communication link by selecting and associating an IPG with said first frame at the first one of said network nodes, a length of said IPG associated with said first frame being selected to specify a second and different data transfer rate to be used next by said two or more network nodes to communicate over said network communication link, said second data transfer rate being different from said first data transfer rate.

22. The method of claim 21, a first value of IPG length associated with a data frame specifying an increase in data transfer rate value between said two or more network nodes used to communicate over said network communication link and said method comprising transmitting said first frame across said network communication link from said first one of said network nodes to the second one of said network nodes to indicate to the second network node that the data transfer rate is to be increased; a second value of IPG length associated with a data frame specifying a decrease in data transfer rate value between said two or more network nodes used to communicate over said network communication link and said method comprising transmitting a third frame across said network communication link from said first one of said network nodes to the second one of said network nodes to indicate to the second network node that the data transfer rate is to be decreased; and a third value of IPG length associated with a data frame specifying no change in data transfer rate value between said two or more network nodes used to communicate over said network communication link and said method comprising transmitting a fourth frame across said network communication link from said first one of said network nodes to the second one of said network nodes to indicate to the second network node that the data transfer rate is to be left unchanged.

23. The method of claim 18, the two or more network nodes communicating over said network communication link at a first data transfer rate; and the method further comprising then controlling the data transfer rate used by said two or more network nodes to communicate over said network communication link by changing the data transfer rate used by said two or more network nodes to communicate over said network communication link by receiving said second frame at said first one of said network nodes, a length of said IPG associated with said second frame specifying a second and different data transfer rate to be used next by said two or more network nodes to communicate over said network communication link; determining said length of said IPG associated with said second frame at said first one of said network nodes; and then based on and in response to said determined length of said IPG associated with said second frame transmitting a third frame from said first network node back to said second network node at said second data transfer rate.

24. The method of claim 23, a first value of IPG length associated with a data frame specifying an increase in data transfer rate value between said two or more network nodes used to communicate over said network communication link and said method comprising receiving said second frame across said network communication link from said second one of said network nodes, said IPG of said second frame having a length of said first value, and increasing the data transfer rate value from said first network node back to said second network node over said network communication link based on and in response to said determined first value of IPG length of said second frame; a second value of IPG length associated with a data frame specifying a decrease in data transfer rate value between said two or more network nodes used to communicate over said network communication link and said method comprising receiving a fourth frame across said network communication link from said second one of said network nodes, said IPG of said fourth frame having a length of said second value, and decreasing the data transfer rate value from said first network node back to said second network node over said network communication link based on and in response to said determined second value of IPG length of said fourth frame; and a third value of IPG length associated with a data frame specifying no change in data transfer rate value between said two or more network nodes used to communicate over said network communication link and said method comprising receiving a fifth frame across said network communication link from the second one of said network nodes, said IPG of said fifth frame having a length of said third value, and leaving unchanged the data transfer rate value from said first network node back to said second network node over said network communication link based on and in response to said determined third value of IPG length of said fifth frame.

25. An information handling system configured as a first network node for communicating with one or more other network nodes over a network communication link, said information handling system comprising:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes; and (b) frame processing logic configured to receive a second frame transmitted across said network communication link from the second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame;

the specified subset of selected network communication parameter/s comprising a feature of said network communication link or protocol used by said network communication link to communicate between said first network node and said one or more other network nodes across said network communication link and that defines at least one of interface capability characteristics, data rate characteristics, data structure characteristics, or a combination thereof.

26. The information handling system of claim 25, the information handling system comprising frame processing logic configured to:

(a) select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes; or (b) receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame and based on and in response to said determined length of said IPG employ said specified subset of selected network communication parameter/s for communication back with said second one of said network nodes over said network communications link;

the specified subset of selected network communication parameter/s comprising a feature of said network communication link or protocol used by said network communication link to communicate between said first network node and said one or more other network nodes across said network communication link and that defines at least one of interface capability characteristics, data rate characteristics, data structure characteristics, or a combination thereof.

27. The information handling system of claim 25, the specified subset of selected network communication parameter/s comprising a specified new data transfer rate to be used by said first network node and said one or more other network nodes to communicate over said network communication link, the new data transfer rate being different than the data transfer rate of the first frame from the first one of said network nodes to the second of said network nodes.

28. The information handling system of claim 27, the information handing system being further configured to increase the energy efficiency of said network communication link by selectively decreasing the data transfer rate used by said first network node and said one or more other network nodes to communicate over said network communication link in order to reduce energy consumption of said first network node and said one or more other network nodes to communicate across said network communication link when a higher data transfer rate is not required or desired by a user application, and only increasing the data transfer rate used by said first network node and said one or more other network nodes to communicate over said network communication link when a higher data transfer rate is required or desired by a user or application.

29. The information handling system of claim 28, the network communication link comprising an Ethernet network communication link.

30. The information handling system of claim 27, the first network node and said one or more other network nodes communicating over said network communication link at a first data transfer rate; and the information handling system being further configured to control the data transfer rate used by said first network node and said one or more other network nodes to communicate over said network communication link by selecting and associating an IPG with said first frame, a length of said IPG associated with said first frame being selected to specify a second and different data transfer rate to be used next by said first network node and said one or more other network nodes to communicate over said network communication link, said second data transfer rate being different from said first data transfer rate.

31. The information handling system of claim 30, a first value of IPG length associated with a data frame specifying an increase in data transfer rate value between said two or more network nodes used to communicate over said network communication link and said information handling system being further configured to transmit said first frame across said network communication link to the second one of said network nodes to indicate to the second network node that the data transfer rate is to be increased; a second value of IPG length associated with a data frame specifying a decrease in data transfer rate value between said two or more network nodes used to communicate over said network communication link and said information handling system being further configured to transmit a third frame across said network communication link to the second one of said network nodes to indicate to the second network node that the data transfer rate is to be decreased; and a third value of IPG length associated with a data frame specifying no change in data transfer rate value between said two or more network nodes used to communicate over said network communication link and said information handling system being further configured to transmit a fourth frame across said network communication link to the second one of said network nodes to indicate to the second network node that the data transfer rate is to be left unchanged.

32. The information handling system of claim 27, the first network node and said one or more other network nodes communicating over said network communication link at a first data transfer rate; and the information handling system being further configured to control the data transfer rate used by said first network node and said one or more other network nodes to communicate over said network communication link by changing the data transfer rate used by said two or more network nodes to communicate over said network communication link by:

receiving said second frame from the second one of said network nodes, a length of said IPG associated with said second frame specifying a second and different data transfer rate to be used next by said first network node and said one or more other network nodes to communicate over said network communication link;

determining said length of said IPG associated with said second frame at said second one of said network nodes; and then transmitting a third frame from said second network node back to said first network node at said second data transfer rate based on and in response to said determined length of said IPG associated with said second frame.

33. The information handling system of claim 32, a first value of IPG length associated with a data frame specifying an increase in data transfer rate value used to communicate between said first network node and said one or more other network nodes over said network communication link; and the information handling system being further configured to receive said second frame across said network communication link from the second one of said network nodes, said IPG of said second frame having a length of said first value, and increase the data transfer rate value from said first network node back to said second one of said network nodes over said network communication link based on and in response to said determined first value of IPG length of said second frame; a second value of IPG length associated with a data frame specifying a decrease in data transfer rate value used to communicate between said first network node and said one or more other network nodes over said network communication link and said information handling system being further configured to receive a fourth frame across said network communication link from the second one of said network nodes, said IPG of said fourth frame having a length of said second value, and decrease the data transfer rate value from said first network node back to said second one of said network nodes over said network communication link based on and in response to said determined second value of IPG length of said fourth frame; and a third value of IPG length associated with a data frame specifying no change in data transfer rate value used to communicate between said first network node and said one or more other network nodes over said network communication link and said information handling system being further configured to receive a fifth frame across said network communication link from the second one of said network nodes, said IPG of said fifth frame having a length of said third value, and leave unchanged the data transfer rate value from said first network node back to said second one of said network nodes over said network communication link based on and in response to said determined third value of IPG length of said fifth frame.

34. The information handling system of claim 25, further comprising a stored correlation between available network communication parameters and IPG gap length; and the frame processing logic being configured to:

select the length of said IPG from the stored correlation between available network communication parameters and IPG gap length for association with the first frame; and determine said specified subset of selected network communication parameter/s associated with said second frame from the stored correlation between available network communication parameters and IPG gap.

35. The information handling system of claim 34, the stored correlation between available network communication parameters and IPG gap length comprising given values of IPG length correlated to respective data transfer rate values.

36. The information handling system of claim 25, the specified subset of selected network communication parameter/s comprising a feature of said network communication link or protocol used by said network communication link to communicate between said two or more network nodes across said network communication link and that defines interface capability characteristics.

37. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link, the length of said IPG being selected to specify a predefined stepwise increase or decrease in data transfer rate to be used by said two or more network nodes to communicate with each other over said network communication link;

or (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, where the specified subset of selected network communication parameter/s comprises a data transfer rate to be used by said two or more network nodes to communicate over said network communication link, the length of said IPG being selected to specify a predefined stepwise increase or decrease in data transfer rate to be used by said two or more network nodes to communicate with each other over said network communication link, and where the method further comprises increasing the data transfer rate by a predefined step relative to the data transfer rate of the second frame or decreasing the data transfer rate by a predefined step relative to the data transfer rate of the second frame at said first one of said network nodes for communication back from said first one of said network nodes to said second one of said network nodes over said network communications link based on and in response to said determined length of said IPG associated with said received second frame.

38. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link, the length of said IPG being selected to specify a predefined stepwise increase or decrease in data transfer rate to be used by said two or more network nodes to communicate with each other over said network communication link;

or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, where the specified subset of selected network communication parameter/s comprises a data transfer rate to be used by said two or more network nodes to communicate over said network communication link, the length of said IPG being selected to specify a predefined stepwise increase or decrease in data transfer rate to be used by said two or more network nodes to communicate with each other over said network communication link, and where the frame processing logic of the information handling system is configured to increase the data transfer rate by a predefined step relative to the data transfer rate of the second frame or to decrease the data transfer rate by a predefined step relative to the data transfer rate of the second frame at said first one of said network nodes for communication back from said first one of said network nodes to said second one of said network nodes over said network communications link based on and in response to said determined length of said IPG associated with said received second frame.

39. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link;

or (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;

where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, where the specified subset of selected network communication parameter/s comprises a specified data transfer rate to be used by said two or more network nodes to communicate over said network communication link, the length of said IPG associated with said second frame being selected to specify a predefined data transfer rate from a predefined correlation of possible data transfer rates and IPG lengths to be used by said two or more network nodes to communicate with each other over said network communication link, and where the method further comprises using the determined IPG length associated with said received second frame to select a given predefined data transfer rate correlating to the determined IPG length from the predefined correlation of possible data transfer rates and IPG lengths for communication back from said first one of said network nodes to said second one of said network nodes over said network communications link.

40. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link;

or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, where the specified subset of selected network communication parameter/s comprises a specified data transfer rate to be used by said two or more network nodes to communicate over said network communication link, the length of said IPG associated with said second frame being selected to specify a predefined data transfer rate from a predefined correlation of possible data transfer rates and IPG lengths to be used by said two or more network nodes to communicate with each other over said network communication link, and where the frame processing logic of the information handling system is configured to increase the data transfer rate by a predefined step relative to the data transfer rate of the second frame or to decrease the data transfer rate by a predefined step relative to the data transfer rate of the second frame at said first one of said network nodes for communication back from said first one of said network nodes to said second one of said network nodes over said network communications link based on and in response to said determined length of said IPG associated with said received second frame.

41. A method of controlling network communication parameters employed by two or more information handling systems communicating as network nodes over a network communication link, comprising at least one of:
   (a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes,
      where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and
      where the specified subset of selected network communication parameter/s comprises a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link, where the predefined correlation includes predefined IPG lengths of 12 bytes, 13 bytes and 14 bytes and predefined data transfer rates of 1 Gbps, 10 Gbps, and 100 Gbps;
or
   (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame,
      where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof,
      where the specified subset of selected network communication parameter/s comprises a specified data transfer rate to be used by said two or more network nodes to communicate over said network communication link, the length of said IPG associated with said second frame being selected to specify a predefined data transfer rate from a predefined correlation of possible data transfer rates and IPG lengths to be used by said two or more network nodes to communicate with each other over said network communication link, and
      where the method further comprises using the determined IPG length associated with said received second frame to select a given predefined data transfer rate correlating to the determined IPG length from the predefined correlation of possible data transfer rates and IPG lengths for communication back from said first one of said network nodes to said second one of said network nodes over said network communications link, where the predefined correlation includes predefined IPG lengths of 12 bytes, 13 bytes and 14 bytes and predefined data transfer rates of 1 Gbps, 10 Gbps, and 100 Gbps.

42. An information handling system configured as a first network node for communicating with one or more other network nodes over a network communication link, said information handling system comprising at least one of:
   (a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes,
      where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and
      where the specified subset of selected network communication parameter/s comprises a specified data transfer rate to be used by said two or more network nodes to communicate over said network communication link, the length of said IPG associated with said first frame being selected to specify a predefined data transfer rate from a predefined correlation of possible data transfer rates and IPG lengths to be used by said two or more network nodes to communicate with each other over said network communication link, where the predefined correlation includes predefined IPG lengths of 12 bytes, 13 bytes and 14 bytes and predefined data transfer rates of 1 Gbps, 10 Gbps, and 100 Gbps;
or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame,
- where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof,
- where the specified subset of selected network communication parameter/s comprises a specified data transfer rate to be used by said two or more network nodes to communicate over said network communication link, the length of said IPG associated with said second frame being selected to specify a predefined data transfer rate from a predefined correlation of possible data transfer rates and IPG lengths to be used by said two or more network nodes to communicate with each other over said network communication link, and
- where the frame processing logic of the information handling system is configured to increase the data transfer rate by a predefined step relative to the data transfer rate of the second frame or to decrease the data transfer rate by a predefined step relative to the data transfer rate of the second frame at said first one of said network nodes for communication back from said first one of said network nodes to said second one of said network nodes over said network communications link based on and in response to said determined length of said IPG associated with said received second frame, where the predefined correlation includes predefined IPG lengths of 12 bytes, 13 bytes and 14 bytes and predefined data transfer rates of 1 Gbps, 10 Gbps, and 100 Gbps.

43. A method of controlling network communication parameters employed by two or more information handling systems communicating as network nodes over a network communication link, comprising at least one of:
    (a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes,
    where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and
    where the specified subset of selected network communication parameter/s comprises a data transfer rate to be used by said two or more network nodes to communicate over said network communication link; the length of said IPG associated with the first frame being set independent of the instantaneous link rate at which the IPG associated with the accompanying first frame is communicated across said network communication link from said first one of said network nodes to the second one of said network nodes;
or
    (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame,
    where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and
    where the specified subset of selected network communication parameter/s comprises a data transfer rate to be used by said two or more network nodes to communicate over said network communication link, the length of said IPG associated with the second frame being set independent of the instantaneous link rate at which the IPG associated with the accompanying second frame is communicated across said network communication link from said second one of said network nodes to the first one of said network nodes.

44. An information handling system configured as a first network node for communicating with one or more other network nodes over a network communication link, said information handling system comprising at least one of:
    (a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link; the length of said IPG associated with the first frame being set independent of the instantaneous link rate at which the IPG associated with the accompanying first frame is communicated across said network communication link from said first one of said network nodes to the second one of said network nodes;

or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link, the length of said IPG associated with the second frame being set independent of the instantaneous link rate at which the IPG associated with the accompanying second frame is communicated across said network communication link from said second one of said network nodes to the first one of said network nodes.

45. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link; and the length of said IPG being larger to specify an increase in data transfer rate to be used by said two or more network nodes to communicate with each other, and the length of said IPG being smaller to specify a decrease in data transfer rate to be used by said two or more network nodes to communicate with each other;

or (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;

where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link; and the length of said IPG being larger to specify an increase in data transfer rate to be used by said two or more network nodes to communicate with each other, and the length of said IPG being smaller to specify a decrease in data transfer rate to be used by said two or more network nodes to communicate with each other.

46. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link, and the length of said IPG being larger to specify an increase in data transfer rate to be used by said two or more network nodes to communicate with each other, and the length of said IPG being smaller to specify a decrease in data transfer rate to be used by said two or more network nodes to communicate with each other;

or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a data transfer rate to be used by said two or more network nodes to communicate over said network communication link; and the length of said IPG being larger to specify an increase in data transfer rate to be used by said two or more network nodes to communicate with each other, and the length of said IPG being smaller to specify a decrease in data transfer rate to be used by said two or more network nodes to communicate with each other.

47. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a feature of said network communication link or protocol used by said network communication link to communicate between said two or more network nodes across said network communication link and that defines data structure characteristics;

or (b) receiving a second frame at a first one of said network nodes, said second frame being transmitted across said network communication link from a second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame, where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof, and where the specified subset of selected network communication parameter/s comprises a feature of said network communication link or protocol used by said network communication link to communicate between said two or more network nodes across said network communication link and that defines data structure characteristics.

48. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a feature of said network communication link or protocol used by said network communication link to communicate between said two or more network nodes across said network communication link and that defines data structure characteristics;

or (b) frame processing logic configured to receive a second frame transmitted across said network communication link from a second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame, where the specified subset of selected network communication parameter/s comprises a feature of said network communication link or protocol used by said network communication link to communicate between said first network node and said one or more other network nodes across said network communication link and that defines at least one of interface capability characteristics, data rate characteristics, data structure characteristics, or a combination thereof, and where the specified subset of selected network communication parameter/s comprises a feature of said network communication link or protocol used by said network communication link to communicate between said two or more network nodes across said network communication link and that defines data structure characteristics.

49. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes; or (b) receiving a second frame at the first one of said network nodes, said second frame being transmitted across said network communication link from the second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;

where the specified subset of selected network communication parameter/s comprises a feature of said network communication link or protocol used by said network communication link to communicate between said two or more network nodes across said network communication link and that defines at least one of interface capability characteristics, data rate characteristics, data structure characteristics, or a combination thereof;

where the specified subset of selected network communication parameter/s comprises a specified data transfer rate to be used by said two or more network nodes to communicate over said network communication link;

where the method further comprises then controlling the data transfer rate used by said two or more network nodes to communicate over said network communication link by selecting and associating an IPG with said first frame at the first one of said network nodes, a length of said IPG associated with said first frame being selected to specify a second and different data transfer rate to be used next by said two or more network nodes to communicate over said network communication link, said second data transfer rate being different from said first data transfer rate;

where a first value of IPG length associated with a data frame specifying an increase in data transfer rate value between said two or more network nodes used to communicate over said network communication link; and where said method further comprising transmitting said first frame across said network communication link from said first one of said network nodes to the second one of said network nodes to indicate to the second network node that the data transfer rate is to be increased; a second value of IPG length associated with a data frame specifying a decrease in data transfer rate value between said two or more network nodes used to communicate over said network communication link and said method comprising transmitting a third frame across said network communication link from said first one of said network nodes to the second one of said network nodes to indicate to the second network node that the data transfer rate is to be decreased; and a third value of IPG length associated with a data frame specifying no change in data transfer rate value between said two or more network nodes used to communicate over said network communication link and said method comprising transmitting a fourth frame across said network communication link from said first one of said network nodes to the second one of said network nodes to indicate to the second network node that the data transfer rate is to be left unchanged.

50. A method of controlling network communication parameters employed by two or more information handling systems communicating as network nodes over a network communication link, comprising at least one of:

(a) selecting and associating an inter-packet gap (IPG) with a first frame at a first one of said network nodes, a length of said IPG being selected to specify a subset of selected network communication parameter/s from a set of available network communication parameters to be used by said two or more network nodes to communicate with each other over said network communication link, and transmitting said first frame across said network communication link from said first one of said network nodes to a second one of said network nodes; or (b) receiving a second frame at the first one of said network nodes, said second frame being transmitted across said network communication link from the second one of said network nodes to said first one of said network nodes with an inter-packet gap (IPG) associated with said second frame, a length of said IPG of said second frame specifying a subset of selected network communication parameter/s from a set of available network communication parameters to be used by said two or more network nodes to communicate with each other over said network communication link, determining said length of said IPG associated with said second frame at said first one of said network nodes and employing said specified subset of selected network communication parameter/s at said first one of said network nodes for communication back with said second one of said network nodes over said network communications link based on and in response to said determined length of said IPG associated with said second frame;

the specified subset of selected network communication parameter/s comprising a feature of said network communication link or protocol used by said network communication link to communicate between said two or more network nodes across said network communication link and that defines at least one of interface capability characteristics, data rate characteristics, data structure characteristics, or a combination thereof;

where the specified subset of selected network communication parameter/s comprises a specified data transfer rate to be used by said two or more network nodes to communicate over said network communication link;

where the two or more network nodes are communicating over said network communication link at a first data transfer rate; and the method further comprises then controlling the data transfer rate used by said two or more network nodes to communicate over said network communication link by changing the data transfer rate used by said two or more network nodes to communicate over said network communication link by receiving said second frame at said first one of said network nodes, a length of said IPG associated with said second frame specifying a second and different data transfer rate to be used next by said two or more network nodes to communicate over said network communication link; determining said length of said IPG associated with said second frame at said first one of said network nodes; and then based on and in response to said determined length of said IPG associated with said second frame transmitting a third frame from said first network node back to said second network node at said second data transfer rate; and where a first value of IPG length associated with a data frame specifies an increase in data transfer rate value between said two or more network nodes used to communicate over said network communication link; and said method comprises receiving said second frame across said network communication link from said second one of said network nodes, said IPG of said second frame having a length of said first value, and increasing the data transfer rate value from said first network node back to said second network node over said network communication link based on and in response to said determined first value of IPG length of said second frame; a second value of IPG length associated with a data frame specifying a decrease in data transfer rate value between said two or more network nodes used to communicate over said network communication link and said method comprising receiving a fourth frame across said network communication link from said second one of said network nodes, said IPG of said fourth frame having a length of said second value, and decreasing the data transfer rate value from said first network node back to said second network node over said network communication link based on and in response to said determined second value of IPG length of said fourth frame; and a third value of IPG length associated with a data frame specifying no change in data transfer rate value between said two or more network nodes used to communicate over said network communication link and said method comprising receiving a fifth frame across said network communication link from the second one of said network nodes, said IPG of said fifth frame having a length of said third value, and leaving unchanged the data transfer rate value from said first network node back to said second network node over said network communication link based on and in response to said determined third value of IPG length of said fifth frame.

51. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes; or (b) frame processing logic configured to receive a second frame transmitted across said network communication link from the second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame;

the specified subset of selected network communication parameter/s comprising a feature of said network communication link or protocol used by said network communication link to communicate between said first network node and said one or more other network nodes across said network communication link and that defines at least one of interface capability characteristics, data rate characteristics, data structure characteristics, or a combination thereof;

where the specified subset of selected network communication parameter/s comprises a specified new data transfer rate to be used by said first network node and said one or more other network nodes to communicate over said network communication link, the new data transfer rate being different than the data transfer rate of the first frame from the first one of said network nodes to the second of said network nodes;

where the first network node and said one or more other network nodes communicate over said network communication link at a first data transfer rate; and the information handling system being further configured to control the data transfer rate used by said first network node and said one or more other network nodes to communicate over said network communication link by selecting and associating an IPG with said first frame, a length of said IPG associated with said first frame being selected to specify a second and different data transfer rate to be used next by said first network node and said one or more other network nodes to communicate over said network communication link, said second data transfer rate being different from said first data transfer rate;

where a first value of IPG length associated with a data frame specifies an increase in data transfer rate value between said two or more network nodes used to communicate over said network communication link and said information handling system being further configured to transmit said first frame across said network communication link to the second one of said network nodes to indicate to the second network node that the data transfer rate is to be increased; a second value of IPG length associated with a data frame specifying a decrease in data transfer rate value between said two or more network nodes used to communicate over said network communication link and said information handling system being further configured to transmit a third frame across said network communication link to the second one of said network nodes to indicate to the second network node that the data transfer rate is to be decreased; and a third value of IPG length associated with a data frame specifying no change in data transfer rate value between said two or more network nodes used to communicate over said network communication link and said information handling system being further configured to transmit a fourth frame across said network communication link to the second one of said network nodes to indicate to the second network node that the data transfer rate is to be left unchanged.

52. An information handling system configured as a first network node for communicating with one or more other network nodes over a network communication link, said information handling system comprising at least one of:

(a) frame processing logic configured to select and associate an inter-packet gap (IPG) with a first frame, a length of said IPG being selected to specify a subset of selected network communication parameter/s from a set of available network communication parameters to be used by said first network node and a second one of said other network nodes to communicate with each other over said network communication link, and transmit said first frame across said network communication link from said first one of said network nodes to said second one of said network nodes; or (b) frame processing logic configured to receive a second frame transmitted across said network communication link from the second one of said network nodes with an inter-packet gap (IPG) associated with said second frame, a length of said IPG of said second frame specifying a subset of selected network communication parameter/s from a set of available network communication parameters to be used by said first network node and said second one of said other network nodes to communicate with each other over said network communication link, determine said length of said IPG associated with said second frame, and employ said specified subset of selected network communication parameter/s for communication back with said second one of said network nodes over said network communications link and based on and in response to said determined length of said IPG associated with said second frame;

the specified subset of selected network communication parameter/s comprising a feature of said network communication link or protocol used by said network communication link to communicate between said first network node and said one or more other network nodes across said network communication link and that defines at least one of interface capability characteristics, data rate characteristics, data structure characteristics, or a combination thereof;

where the specified subset of selected network communication parameter/s comprises a specified new data transfer rate to be used by said first network node and said one or more other network nodes to communicate over said network communication link, the new data transfer rate being different than the data transfer rate of the first frame from the first one of said network nodes to the second of said network nodes;

where the first network node and said one or more other network nodes communicate over said network communication link at a first data transfer rate; and the information handling system being further configured to control the data transfer rate used by said first network node and said one or more other network nodes to communicate over said network communication link by changing the data transfer rate used by said two or more network nodes to communicate over said network communication link by:
- receiving said second frame from the second one of said network nodes, a length of said IPG associated with said second frame specifying a second and different data transfer rate to be used next by said first network node and said one or more other network nodes to communicate over said network communication link,
- determining said length of said IPG associated with said second frame at said second one of said network nodes, and
- then transmitting a third frame from said second network node back to said first network node at said second data transfer rate based on and in response to said determined length of said IPG associated with said second frame;

where a first value of IPG length associated with a data frame specifies an increase in data transfer rate value used to communicate between said first network node and said one or more other network nodes over said network communication link; and the information handling system being further configured to receive said second frame across said network communication link from the second one of said network nodes, said IPG of said second frame having a length of said first value, and increase the data transfer rate value from said first network node back to said second one of said network nodes over said network communication link based on and in response to said determined first value of IPG length of said second frame; a second value of IPG length associated with a data frame specifying a decrease in data transfer rate value used to communicate between said first network node and said one or more other network nodes over said network communication link and said information handling system being further configured to receive a fourth frame across said network communication link from the second one of said network nodes, said IPG of said fourth frame having a length of said second value, and decrease the data transfer rate value from said first network node back to said second one of said network nodes over said network communication link based on and in response to said determined second value of IPG length of said fourth frame; and a third value of IPG length associated with a data frame specifying no change in data transfer rate value used to communicate between said first network node and said one or more other network nodes over said network communication link and said information handling system being further configured to receive a fifth frame across said network communication link from the second one of said network nodes, said IPG of said fifth frame having a length of said third value, and leave unchanged the data transfer rate value from said first network node back to said second one of said network nodes over said network communication link based on and in response to said determined third value of IPG length of said fifth frame.

* * * * *